United States Patent
Malik et al.

(10) Patent No.: US 9,918,195 B2
(45) Date of Patent: Mar. 13, 2018

(54) SIGNALING USAGE OF CYCLIC SHIFT DIVERSITY IN TRANSMITTING WIRELESS DEVICES

(71) Applicant: QUALCOMM Incorporated, San Diego, CA (US)

(72) Inventors: Rahul Malik, San Diego, CA (US); Carlos Horacio Aldana, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/346,482

(22) Filed: Nov. 8, 2016

(65) Prior Publication Data
US 2017/0134900 A1    May 11, 2017

Related U.S. Application Data

(60) Provisional application No. 62/253,024, filed on Nov. 9, 2015, provisional application No. 62/278,854, filed on Jan. 14, 2016.

(51) Int. Cl.

| | |
|---|---|
| H04W 24/00 | (2009.01) |
| H04W 4/02 | (2018.01) |
| H04B 17/27 | (2015.01) |
| G01S 3/72 | (2006.01) |
| G01S 3/74 | (2006.01) |
| H04B 7/06 | (2006.01) |

(Continued)

(52) U.S. Cl.
CPC ............. *H04W 4/023* (2013.01); *G01S 3/72* (2013.01); *G01S 3/74* (2013.01); *H04B 7/0682* (2013.01); *H04B 17/27* (2015.01); *H04L 1/0086* (2013.01); *H04L 5/0044* (2013.01); *H04L 5/0053* (2013.01)

(58) Field of Classification Search
CPC ..... H04W 4/023; H04B 17/27; H04B 7/0682; G01S 3/72; G01S 3/74; H04L 5/0044; H04L 5/0053; H04L 1/0086
See application file for complete search history.

(56) References Cited

U.S. PATENT DOCUMENTS 8,848,686 B1    9/2014 Cheng et al.
2014/0086284 A1*  3/2014 Lakhzouri ............. G01S 5/0273
                                                   375/219

(Continued)

OTHER PUBLICATIONS

International Search Report and Written Opinion—PCT/US2016/061127—ISA/EPO—dated Feb. 24, 2017.

*Primary Examiner* — Khai M Nguyen
(74) *Attorney, Agent, or Firm* — Paradice and Li LLP

(57) ABSTRACT

Aspects of the present disclosure may compensate for cyclic shift delays (CSD) in transmitted signals when estimating angle of arrival information of a wireless signal transmitted by a transmitting device. In some aspects, a receiving device may determine a presence of CSD in the wireless signal, and estimate an angle of arrival of the wireless signal based at least in part on the presence of CSD. For example, the receiving device may determine a first tap of the wireless channel based at least in part on the CSD. The receiving device may then determine a phase difference of the wireless signal between a plurality of antennas of the receiving device based on the first tap of the wireless channel. The receiving device may estimate the angle of arrival of the wireless signal based on the phase difference.

26 Claims, 13 Drawing Sheets

(51) Int. Cl.
*H04L 5/00* (2006.01)
*H04L 1/00* (2006.01)

(56) References Cited

U.S. PATENT DOCUMENTS

| | | | |
|---|---|---|---|
| 2014/0087751 A1* | 3/2014 | Do | G01S 5/0205 455/456.1 |
| 2014/0153420 A1* | 6/2014 | Garin | H04B 7/0671 370/252 |
| 2014/0194154 A1* | 7/2014 | Sridhara | H04L 25/0202 455/500 |
| 2015/0124713 A1 | 5/2015 | Salhov et al. | |
| 2015/0264161 A1* | 9/2015 | Tian | H04L 69/22 370/338 |
| 2016/0157127 A1* | 6/2016 | Zeger | H04L 43/16 370/392 |
| 2016/0255645 A1* | 9/2016 | Li | H04L 5/0023 370/329 |

* cited by examiner

| L-STF 512 | L-LTF 513 | L-SIG 514 | VHT-SIG-A 515 | VHT-STF 516 | VHT-LTF 517 | VHT-SIG-B 518 |

FIG. 5B

| L-STF 512 | L-LTF 513 | L-SIG 514 | RL-SIG 521 | HE-SIG-A1/HE-SIG-A2 522 | HE-SIG-B 523 | HE-STF 524 | HE-LTF 525 |

FIG. 5C

SIGNALING USAGE OF CYCLIC SHIFT DIVERSITY IN TRANSMITTING WIRELESS DEVICES

CROSS-REFERENCE TO RELATED APPLICATIONS

This application claims priority under 35 USC 119(e) to commonly owned U.S. Provisional Patent Application No. 62/253,024 entitled "SIGNALING USAGE OF CYCLIC SHIFT DIVERSITY IN TRANSMITTING WIRELESS DEVICES" filed on Nov. 9, 2015 and to commonly owned U.S. Provisional Patent Application No. 62/278,854 entitled "SIGNALING USAGE OF CYCLIC SHIFT DIVERSITY IN TRANSMITTING WIRELESS DEVICES" filed on Jan. 14, 2016, the entireties of both of which are incorporated by reference herein.

TECHNICAL FIELD

Aspects of the present disclosure relate generally to wireless networks, and specifically to estimating the angle of arrival and angle of departure of signals in wireless networks.

BACKGROUND

Angle of arrival (AoA) and angle of departure (AoD) information of wireless signals transmitted between devices may be estimated and thereafter used to determine the relative position and orientation of the devices. For example, signals may be received by a first device from a second device, and the first device may use AoA and/or AoD information of the received signals to determine a line of bearing with respect to the second device. If the location and orientation of the second device is known, then the first device may determine its position and orientation relative to the second device.

Because estimating AoA and AoD information is a passive positioning technique (e.g., the first device does not need to transmit any signals to the second device), and the first device may consume less power and bandwidth compared to devices that perform active positioning operations (e.g., such as active ranging operations using fine timing measurement (FTM) frames). In addition, because passive positioning operations based on estimating AoA and AoD information may be performed without capturing time of arrival (TOA) or time of departure (TOD) information, the accuracy of passive positioning operations is not dependent upon timing synchronization between the devices or processing delays associated with the devices.

Because positioning operations are becoming increasingly important for device location and tracking in wireless networks, it would be desirable to improve the accuracy of estimated AoA and AoD information without sacrificing performance.

SUMMARY

This Summary is provided to introduce in a simplified form a selection of concepts that are further described below in the Detailed Description. This summary is not intended to identify key features or essential features of the claimed subject matter, nor is it intended to limit the scope of the claimed subject matter.

Apparatuses and method for estimating angle of arrival information are disclosed herein. In one aspect, a method is disclosed. The method may be performed by a receiving device, and may include receiving a wireless signal from a transmitting device over a wireless channel; determining a presence of cyclic shift diversity (CSD) in the wireless signal; and estimating an angle of arrival of the wireless based at least in part on the presence of CSD.

In another aspect, a receiving device is disclosed. The receiving device may include one or more processors and a memory. The memory may include instructions that, when executed by the one or more processors, cause the receiving device to receive a wireless signal from a transmitting device over a wireless channel; determine a presence of cyclic shift diversity (CSD) in the wireless signal; and estimate an angle of arrival of the wireless signal based at least in part on the presence of CSD.

In another aspect, a non-transitory computer-readable medium is disclosed. The non-transitory computer-readable medium may comprise instructions that, when executed by a receiving device, cause the receiving device to perform a number of operations. The number of operations may include receiving a wireless signal from a transmitting device over a wireless channel; determining a presence of cyclic shift diversity (CSD) in the wireless signal; and estimating an angle of arrival of the wireless signal based at least in part on the presence of CSD.

In another aspect, a receiving device is disclosed. The receiving device may include means for receiving a wireless signal from a transmitting device over a wireless channel; means for determining a presence of cyclic shift diversity (CSD) in the wireless signal; and means for estimating an angle of arrival of the wireless signal based at least in part on the presence of CSD.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5B shows a very high throughput (VHT) preamble within which aspects of the present disclosure may be implemented.

FIG. 5C shows a high efficiency (HE) preamble within which aspects of the present disclosure may be implemented.

DETAILED DESCRIPTION

Figure 1:
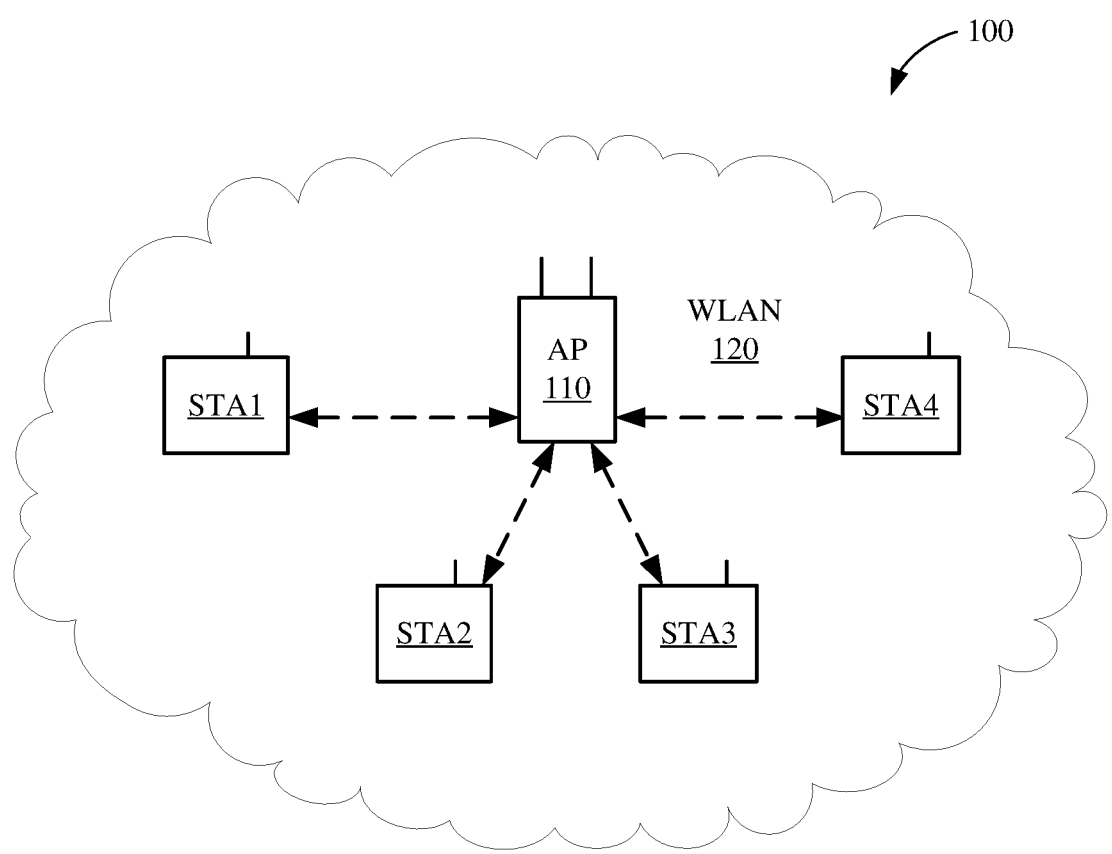
FIG. 1 shows a block diagram of a wireless system within which aspects of the present disclosure may be implemented.

Aspects of the present disclosure are described below in the context of estimating angle of arrival (AoA) and angle of departure (AoD) information for devices deployed in a wireless local area network (WLAN) for simplicity only. It is to be understood that aspects of the present disclosure are equally applicable to estimating AoA and/or AoD information for devices deployed in other wireless networks (e.g., cellular networks, personal area networks, pico networks, femto networks, satellite networks). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including an AP and a plurality of STAs, aspects of the present disclosure are equally applicable to other WLAN systems including, for example, WLANs including a plurality of APs, peer-to-peer (or Independent Basic Service Set) systems, Wi-Fi Direct systems, and/or Hotspots. Further, although described herein in terms of exchanging data packets between wireless devices, aspects of the present disclosure may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs. The PDUs and/or PPDUs may include a physical-layer (PHY) service data unit (PSDU), which in turn may contain encapsulated data such as, for example, a MAC service data unit (MSDU) or a MAC frame.

Further, as used herein, the term "HT" may refer to a high throughput frame format or protocol defined, for example, by the IEEE 802.11n standards; the term "VHT" may refer to a very high throughput frame format or protocol defined, for example, by the IEEE 802.11ac standards; the term "HE" may refer to a high efficiency frame format or protocol defined, for example, by the IEEE 802.11ax standards; and the term "non-HT" may refer to a legacy frame format or protocol defined, for example, by the IEEE 802.11a/g standards. Thus, the terms "legacy" and "non-HT" may be used interchangeably herein. In addition, the term "legacy device" as used herein may refer to a device that operates according to the IEEE 802.11a/g standards, and the term "HE device" as used herein may refer to a device that operates according to the IEEE 802.11ax and/or 802.11az standards.

In the following description, numerous specific details are set forth such as examples of specific components, circuits, and processes to provide a thorough understanding of the present disclosure. The term "coupled" as used herein means connected directly to or connected through one or more intervening components or circuits. The term "angle information" as used herein may refer to AoA information and/or AoD information. Also, in the following description and for purposes of explanation, specific nomenclature is set forth to provide a thorough understanding of the present disclosure. However, it will be apparent to one skilled in the art that these specific details may not be required to practice the example implementations. In other instances, well-known circuits and devices are shown in block diagram form to avoid obscuring the present disclosure. The present disclosure is not to be construed as limited to specific examples described herein but rather to include within their scopes all implementations defined by the appended claims.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), assessing (e.g., assessing data in a memory) and the like. Also, "determining" may include resolving, selecting, choosing, establishing and the like. Also, "determining" may include measuring, estimating, and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims. Also, the example wireless communications devices may include components other than those shown.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

As mentioned above, a receiving device may use AoA and/or AoD information of signals received from a transmitting device to determine its position and/or orientation relative to the transmitting device. Recent revisions to the IEEE 802.11 family of standards provide mechanisms for a transmitting device to provide its location and orientation to a number of receiving devices. This information may assist the receiving devices to determine their positions based on AoA information and/or AoD information of signals received from the transmitting device. Some transmitting devices may employ transmit diversity techniques in which multiple antennas are used to transmit signals to receiving devices having fewer antennas than the transmitting device. For example, a transmitting device may use four transmit antennas to transmit a packet to a receiving device having only two antennas (e.g., a 4×2 MIMO configuration). Such transmissions may use cyclic shift diversity (CSD) across the transmit antennas to avoid unintentional beamforming. CSD—which may also be referred to as cyclic delay diversity (CDD)—introduces a delay between signals transmitted by different antennas of a transmitting device. This delay may cause signals received from the transmit antennas to appear as multipath signals to the receiving device, and may degrade the receiving device's ability to accurately determine AoA information. These are at least some of the technical problems to be solved by various aspects of the present disclosure.

The apparatuses and methods disclosed herein may improve the accuracy of estimated AoA information by allowing a transmitting device to indicate whether a specified signal is transmitted with CSD. In instances where CSD is used, the transmitting device may further indicate the number of transmit antennas and/or the CSD delay values employed to transmit the specified signal. For example, a receiving device may determine a CSD pattern associated with the specified signal based on the number of transmit antennas used to transmit the specified signal and a known CSD pattern for the specified number of transmit antennas (e.g., as specified in the IEEE 802.11 specification).

The indication as to whether CSD is used to transmit the specified signal may hereinafter be referred to as the CSD indicator, and the indications as to how many transmit antennas are used and/or the CSD delay values employed to transmit the specified signal may hereinafter be referred to as the CSD format information. From the above, it would be apparent that parts of the CSD indicator and/or the CSD format information may be signaled implicitly (e.g., via a specification or agreed upon convention) or explicitly (e.g., via a field in the transmitted packet). A receiving device may use the CSD indicator to determine the accuracy of its estimated AoA information. For example, since CSD causes phases shifts in the transmitted signal (from different antennas), the presence of CSD may reduce the accuracy of the estimated AoA information. Further, the receiving device may use the CSD format information to compensate for the CSD format used to transmit the specified signal. For example, with knowledge of the CSD format, the receiving device may adjust the manner in which it estimates the AoA information of the received signals (e.g., to compensate for the phase shifts attributable to CSD). These and other details of the present disclosure, which provide one or more solutions to the aforementioned technical problems, are discussed in detail below.

FIG. 1 shows a block diagram of an example wireless system 100 within which aspects of the present disclosure may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 may be assigned a unique MAC address that is programmed therein by, for example, the manufacturer of the access point. Similarly, each of stations STA1-STA4 is also assigned a unique MAC address. Although not specifically shown in FIG. 1, for at least some implementations, the stations STA1-STA4 may exchange signals directly with each other (e.g., without the presence of AP 110).

For some implementations, the wireless system 100 may correspond to a multiple-input multiple-output (MIMO) wireless network, and may support single-user MIMO (SU-MIMO) and multi-user MIMO (MU-MIMO) communications. Further, although the WLAN 120 is depicted in FIG. 1 as an infrastructure Basic Service Set (BSS), for other implementations, WLAN 120 may be an Independent Basic Service Set (IBSS), an Extended Basic Service Set (EBSS), an ad-hoc network, or a peer-to-peer (P2P) network (e.g., operating according to the Wi-Fi Direct protocols).

The stations STA1-STA4 may be any suitable Wi-Fi enabled wireless devices including, for example, cell phones, personal digital assistants (PDAs), tablet devices, laptop computers, or the like. The stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some implementations, each of stations STA1-STA4 may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6-8.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least some implementations, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described operations described above or below with respect to FIGS. 6-8. For other implementations, one or more functions of AP 110 may be performed by one of stations STA1-STA4 (e.g., operating as a soft AP).

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct frequency bands and/or using distinct communication protocols. For example, the Wi-Fi transceiver may communicate within a 2.4 GHz frequency band, within a 5 GHz frequency band, and/or within a 60 GHz frequency band in accordance with the IEEE 802.11 family of standards. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). For other implementations, the transceivers included within the stations STA1-STA4 and/or the AP 110 may be any technically feasible transceiver such as a ZigBee transceiver described by a specification from the ZigBee specification, a WiGig transceiver, and/or a HomePlug transceiver described by a specification from the HomePlug Alliance.

AP 110 may periodically broadcast beacon frames to enable any STAs within wireless range of the AP 110 to establish and/or maintain a communication link with the wireless network 100. The beacon frames, which may include a traffic indication map (TIM) indicating whether the AP 110 has queued downlink data for the stations STA1-STA4, are typically broadcast according to a target beacon transmission time (TBTT) schedule. The broadcasted beacon frames may also include the AP's timing synchronization function (TSF) value. The stations STA1-STA4 may synchronize their own local TSF values with the broadcasted TSF value, for example, so that all the stations STA1-STA4 are synchronized with each other and the AP 110.

For at least some implementations, each of the stations STA1-STA4 and AP 110 may include RF ranging circuitry (e.g., formed using well-known software modules, hardware components, and/or a suitable combination thereof) that may be used to estimate the distance between itself and another Wi-Fi enabled device using any suitable ranging operation. In addition, each of the stations STA1-STA4 and/or AP 110 may include a local memory (not shown in FIG. 1 for simplicity) to store a cache of Wi-Fi access point and/or station data.

Figure 2:
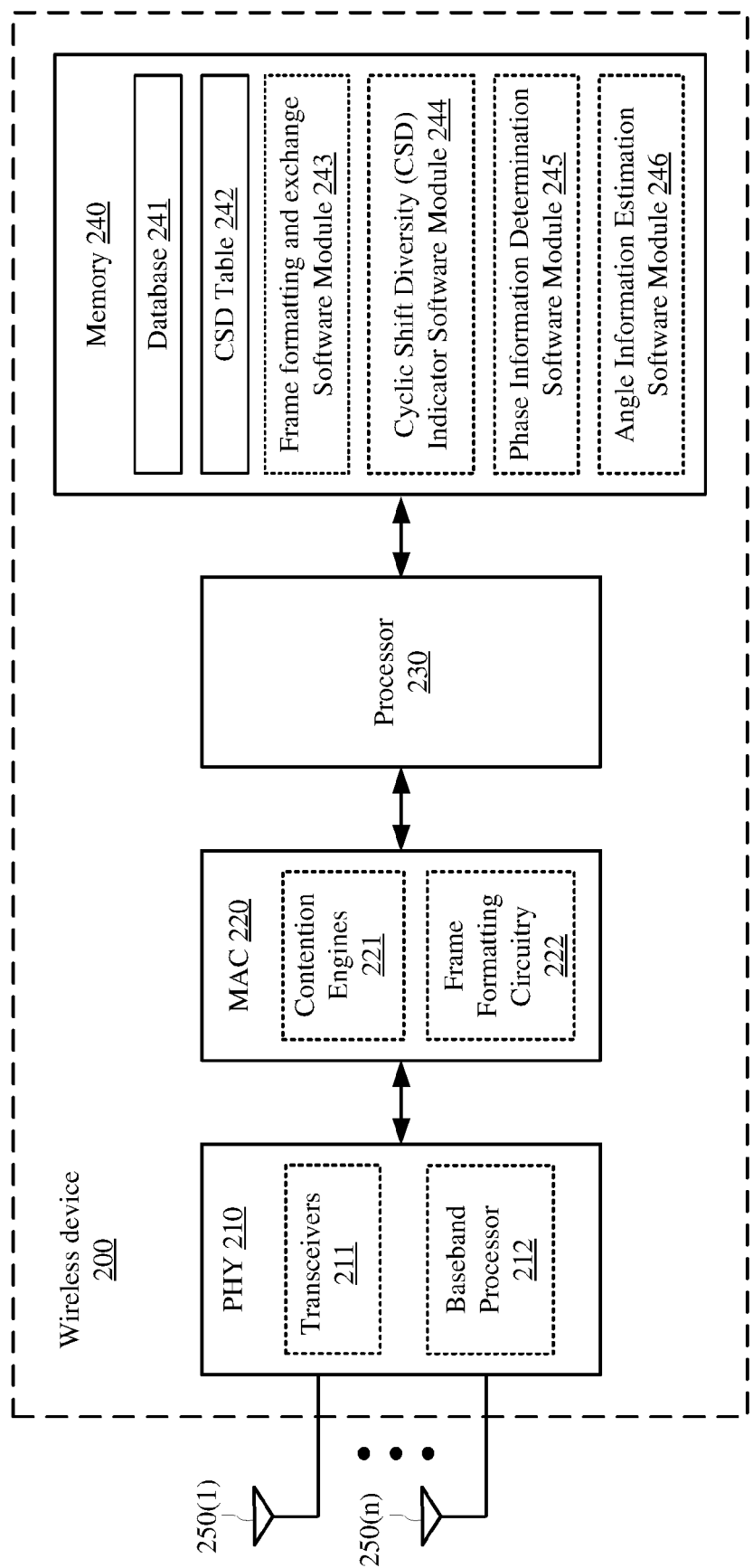
FIG. 2 shows a block diagram of a wireless device in accordance with aspects of the present disclosure.

FIG. 2 shows a wireless device 200 that may be one implementation of at least one of the stations STA1-STA4 or the AP 110 of FIG. 1. The wireless device 200 may include a physical-layer device (PHY) 210, may include a medium access controller (MAC) 220, may include a processor 230, may include a memory 240, and may include a number of antennas 250(1)-250(n). The PHY 210 may include at least a number of transceivers 211 and a baseband processor 212. The transceivers 211 may be coupled to antennas 250(1)-250(n), either directly or through an antenna selection circuit (not shown for simplicity). The transceivers 211 may be used to transmit signals to and receive signals from other wireless devices including, for example, AP 110 and/or one or more of the stations STA1-STA4 of FIG. 1. Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, the wireless device 200 may be configured for MIMO operations. The MIMO operations may include SU-MIMO operations and/or MU-MIMO operations. Further, n some aspects, the wireless device 200 may use multiple antennas 250(1)-250(n) to provide antenna diversity. Antenna diversity may include polarization diversity, pattern diversity, and/or spatial diversity.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

The MAC 220 may include at least a number of contention engines 221 and frame formatting circuitry 222. The contention engines 221 may contend for access to one or more shared wireless mediums, and may also store packets for transmission over one or more shared wireless mediums. For other implementations, the contention engines 221 may be separate from MAC 220. For still other implementations, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY 210 (e.g., by stripping MAC headers from frames received from PHY 210). In some aspects, the frame formatting circuitry 222 may be used to embed a CSD indicator and/or CSD format information within packets or signals to be transmitted from wireless device 200. The CSD indicator may indicate whether the packets or signals are transmitted, from multiple antennas, using CSD. The CSD format information may indicate a number of transmit antennas and/or CSD values used to transmit the packets or signals.

Memory 240 may include a database 241 that may store location data, configuration information, data rates, MAC addresses, and other suitable information about (or pertaining to) a number of access points, stations, and/or other wireless devices. The database 241 may also store profile information for a number of wireless devices. The profile information for a given wireless device may include, for example, the wireless device's service set identifier (SSID), channel information, received signal strength indicator (RSSI) values, goodput values, channel state information (CSI), and connection history with wireless device 200.

Memory 240 may include a CSD table 242 that may store CSD information for one or more other devices. The CSD information may include CSD indicators and/or CSD format information for each of the one or more other devices. In some aspects, the CSD information for a given device may be stored in the CSD table 242 upon reception of signals transmitted from the given device and/or in response to prior signal exchanges between wireless device 200 and the given device. In other aspects, the CSD information for a given device may be obtained from or shared by another device (e.g., a device that previously obtained CSD information of the given device).

Memory 240 may also include a non-transitory computer-readable storage medium (e.g., one or more nonvolatile memory elements, such as EPROM, EEPROM, Flash memory, a hard drive, and so on) that may store the following software modules:
- a frame formation and exchange software module 243 to facilitate the creation and exchange of frames (e.g., data frames, control frames, management frames, and action frames), for example, as described below with respect to FIGS. 6-8;
- a cyclic shift diversity (CSD) indicator software module 244 to facilitate the detection of CSD indicators and/or CSD format information in received packets or frames and/or to facilitate the insertion of CSD indicators and/or CSD format information in transmitted packets or frames, for example, as described below with respect to FIGS. 6-8;
- a phase information determination software module 245 to facilitate the determination of phase information of wireless signals received from other devices and/or to adjust the manner in which the phase information is determined when the wireless signals are transmitted with CSD, for example, as described below with respect to FIGS. 6-8; and
- an angle information estimation software module 246 to estimate AoA and/or AoD information of received wireless signals based, at least in part, on phase information provided by the phase information determination software module 245, CSD indicators, and/or CSD format information, for example, as described below with respect to FIGS. 6-8.

Each software module includes instructions that, when executed by processor 230, may cause wireless device 200 to perform the corresponding functions. The non-transitory computer-readable medium of memory 240 thus includes instructions for performing all or a portion of the operations of the method of FIGS. 6-8.

Processor 230 may be one or more suitable processors capable of executing scripts or instructions of one or more software programs stored in wireless device 200 (e.g., within memory 240). For example, processor 230 may execute the frame formation and exchange software module 243 to facilitate the creation and exchange of frames (e.g., data frames, control frames, management frames, and action frames). Processor 230 may also execute the CSD indicator software module 244 to facilitate the detection of CSD indicators and/or CSD format information in received packets or frames. Execution of the CSD indicator software module 244 may also be used to facilitate the insertion of CSD indicators and/or CSD format information into packets or frames transmitted from wireless device 200. Processor 230 may also execute the phase information determination software module 245 to facilitate the determination of phase information of wireless signals received from other devices and/or to adjust the manner in which the phase information is determined when the wireless signals are transmitted with CSD. Processor 230 may also execute the angle information estimation software module 246 to estimate AoA and/or AoD information of received wireless signals based, at least in part, on phase information provided by the phase information determination software module 245, CSD indicators, and/or CSD format information.

A receiving device may include any number of antennas, for example, as depicted by wireless device 200 of FIG. 2. Thus, when a signal is transmitted from a transmitting device to a receiving device, the wireless signal may be received by different antennas of the receiving device at different times—and therefore with different phases—due to physical spacing between the antennas of the receiving device.

A transmitting device may also include any number of antennas, for example, as depicted by wireless device 200 of FIG. 2. Thus, when a signal is transmitted from a transmitting device to a receiving device, an antenna of the receiving device may receive a signal component from each of the transmitting device's antennas at different times—and therefore with different phases—due to physical spacing between the antennas of the transmitting device and/or phase shifts applied to the signals transmitted using different antennas (e.g., based on CSD).

Figure 3A:
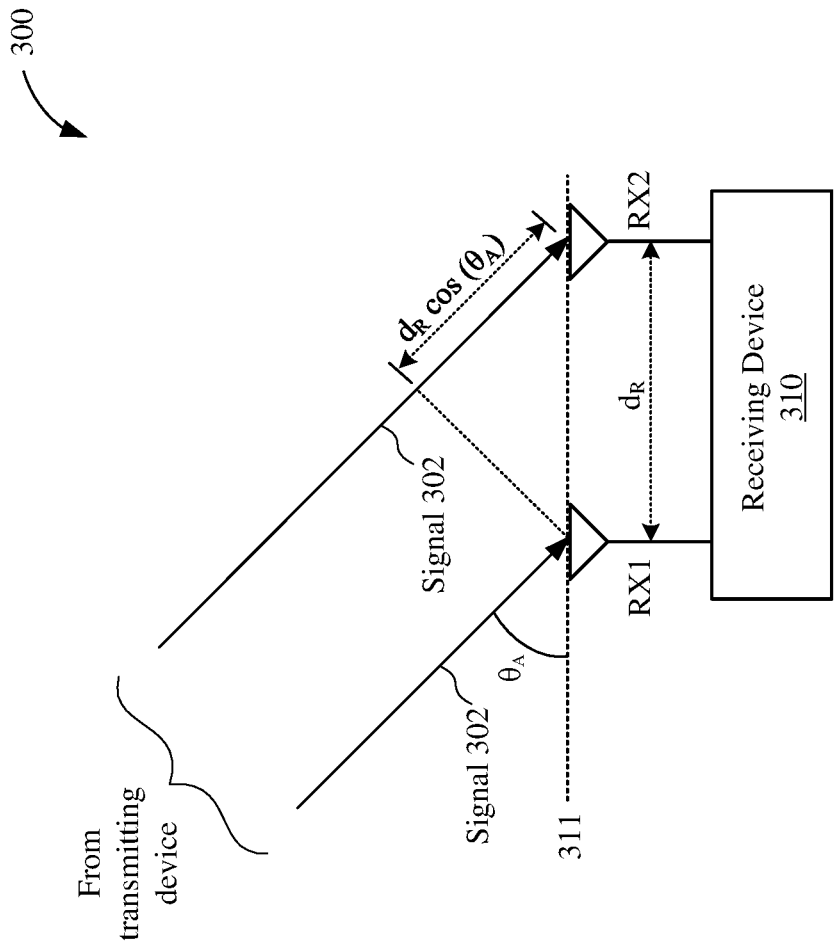
FIG. 3A shows an example reception of a wireless signal by two antennas of a receiving device.

FIG. 3A is an illustration 300 depicting reception of a signal 302 by a receiving device 310 that includes two antennas RX1 and RX2 separated by a distance $d_R$. For the example of FIG. 3A, the signal 302 is received at the first antenna RX1 and the second antenna RX2 at an angle of arrival $\theta_A$ relative to an axis line 311 extending between the first and second antennas RX1 and RX2. Because the first and second antennas RX1 and RX2 are separated by a distance $d_R$, the signal 302 as received by the second antenna RX2 travels a distance equal to d cos $\theta_A$ longer than the signal 302 as received by first antenna RX1. The phase difference observed between the first and second antennas RX1 and RX2 may be expressed as:

$$\Delta Phase = \frac{2\pi d_R \cos\theta_A}{\lambda}$$

where $\lambda$ is the wavelength of signal 302. Assuming d≈$\lambda$/2, then this phase difference may be expressed as:

$$\Delta Phase = \pi \cos \theta_A$$

In some aspects, the phase difference between the signal 302 as received by the first antenna RX1 and the signal 302 as received by the second antenna RX2 may be referred to as the phase information of the signal 302. Thereafter, the receiving device 310 may estimate the angle of arrival $\theta_A$ of the signal 302 received from the transmitting device based on the determined phase information (or phase difference) using any suitable well-known techniques.

Figure 3B:
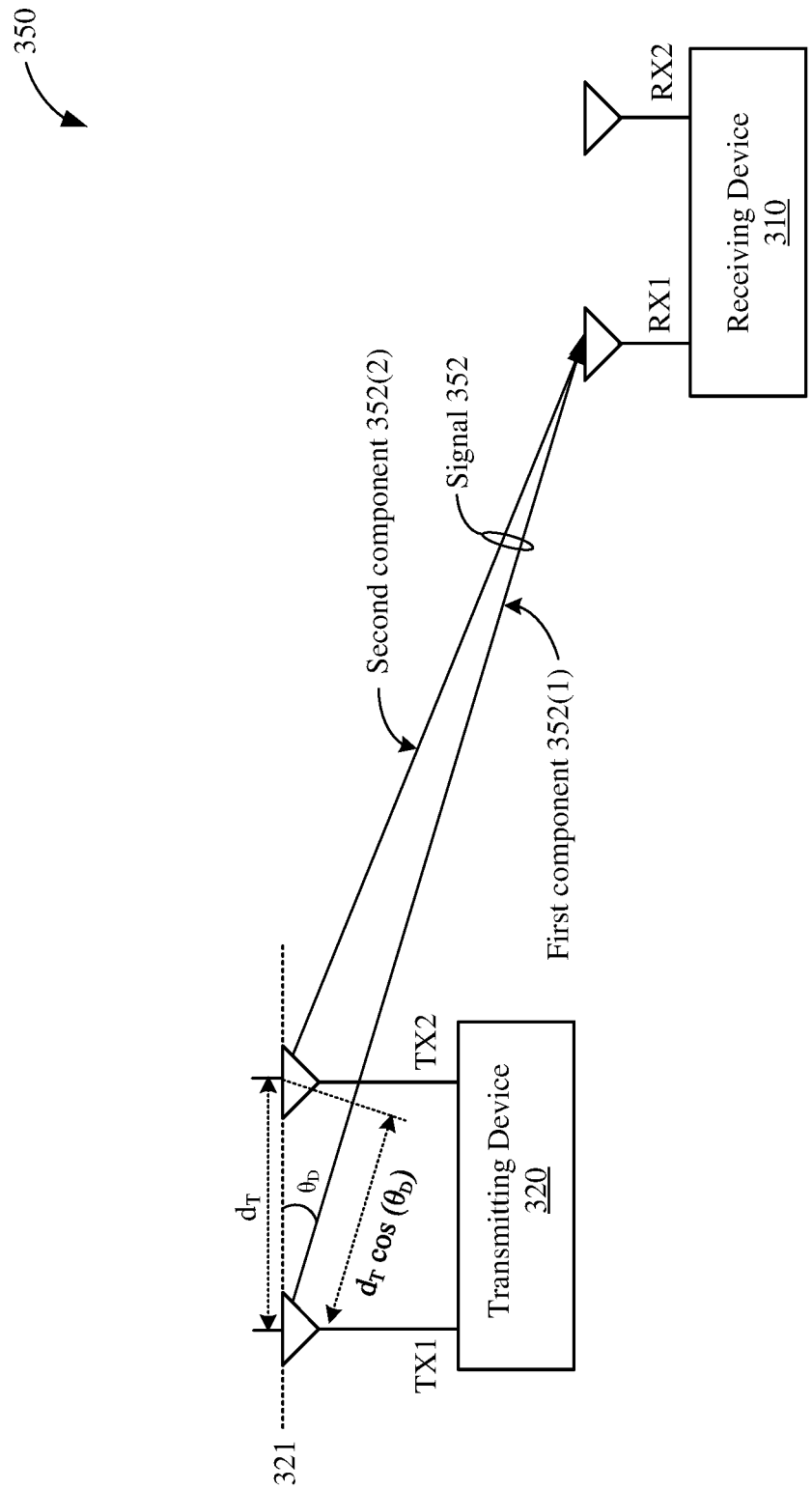
FIG. 3B shows an example transmission of a wireless signal from two antennas of a transmitting device to a single antenna of a receiving device.

FIG. 3B is an illustration 350 depicting transmission of a wireless signal 352 from a transmitting device 320 to the receiving device 310. The transmitting device 320 is shown to include first and second antennas TX1 and TX2 separated by a distance $d_T$. For the example of FIG. 3B, signal 352 is transmitted from the first and second antennas TX1 and TX2 of the transmitting device 320 at a departure angle $\theta_D$ relative to an axis line 321 extending between the first and second antennas TX1 and TX2, and is received by the first antenna Rx1 of the receiving device 310. Because the first and second antennas TX1 and TX2 are separated by a distance $d_T$, a first component 352(1) of the signal 352 transmitted by the first antenna TX1 travels a distance equal to $d_T$ cos $\theta_D$ longer than a second component 352(2) of the signal 352 transmitted by the second antenna TX2. The phase difference between the first component 352(1) and the second component 352(2), as observed at the first antenna RX1 of the receiving device 310, may be expressed as:

$$\Delta Phase = \frac{2\pi d_T \cos\theta_D}{\lambda}$$

where $\lambda$ is the wavelength of signal 352. Assuming d≈$\lambda$/2, then this phase difference may be expressed as:

$$\Delta Phase = \pi \cos \theta_D$$

In some aspects, the phase difference between the first component 352(1) and the second component 352(2) may be referred to as the phase information of the signal 352. Thereafter, the receiving device 310 may estimate the angle of departure $\theta_D$ of the signal 352 from the transmitting device 320 based on the determined phase information or phase difference ($\Delta$Phase) using any suitable well-known techniques.

It is noted that multipath signal propagation (e.g., multipath effects) may degrade the accuracy with which the receiving device 310 may estimate AoA and AoD information. One or more suitable techniques including, for example, ESPRIT (Estimation of Signal Parameters via Rotational Invariance Techniques) and MUSIC (MUltiple SIgnal Classification) or Bartlett or Capon methods may be used for estimating AoA and AoD information in the presence of multipath effects.

As discussed above, some transmitting devices may employ transmit diversity techniques, such as cyclic shift diversity (CSD), between its transmitting antennas to avoid unintentional beamforming. However, the phase shifts introduced by CSD may interfere with a receiving device's ability to accurately estimate AoA information for received signals, for example, because the phase shifts associated with CSD may be perceived as multipath signals at the receiving device.

Figure 3C:
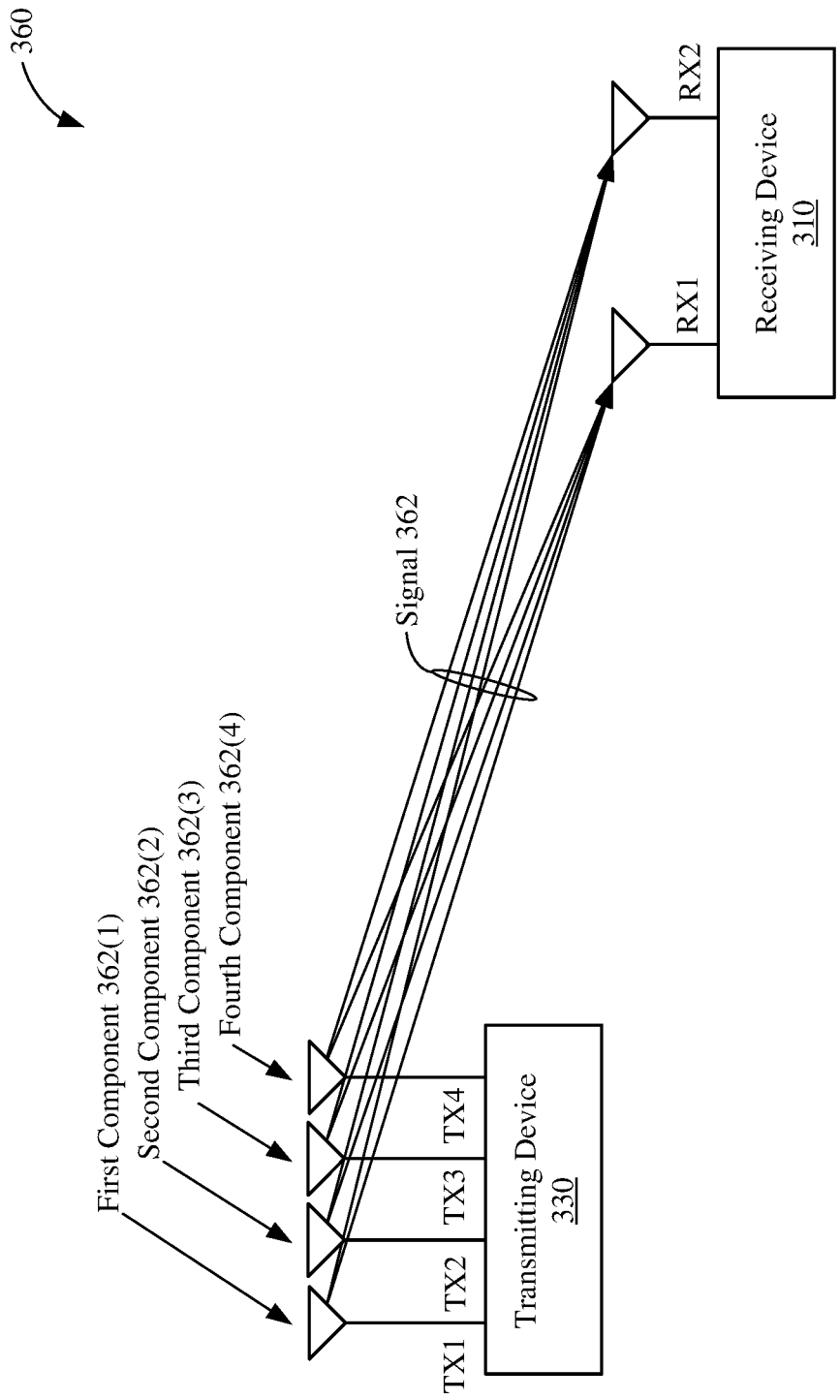
FIG. 3C shows an example transmission of a wireless signal from two antennas of a transmitting device to two antennas of a receiving device.

FIG. 3C is an illustration 360 depicting transmission of a wireless signal 362 from a transmitting device 330 to the receiving device 310. For the example of FIG. 3C, the transmitting device 330 is shown to include four antennas TX1-TX4, whereas the receiving device 310 includes only two antennas RX1 and RX2. Each of the antennas TX1-TX4 transmits a respective component 362(1)-362(4) of the wireless signal 362. In some aspects, the transmitting device 330 may implement cyclic shift diversity when transmitting the wireless signal 362 to the receiving device 310, for example, to avoid unintentional beamforming at the receiving device 310 (e.g., since the number of transmit antennas TX1-TX4 exceeds the number of receive antennas RX1 and RX2).

For example, the second component 362(2) of the wireless signal 362 (e.g., transmitted by TX2) may be phase-shifted in relation to the first component 362(1); the third component 362(3) of the wireless signal 362 (e.g., transmitted by TX3) may be further phase-shifted in relation to the second component 362(2); and the fourth component 362(4) of the wireless signal 362 (e.g., transmitted by TX4) may be further phase-shifted in relation to the third component 362(3). As a result of the phase shifts between the various components 362(1)-362(4) of the wireless signal 362, the receiving device 310 may detect a number of phase differences between its antennas RX1 and RX2 based on the received wireless signal 362. This may affect the accuracy with which the receiving device 310 is able to estimate the angel of arrival of the wireless signal 362.

As mentioned above, aspects of the present disclosure may improve the accuracy with which the receiving device 310 may estimate AoA information of wireless signals transmitted from the transmitting device 330 by allowing the transmitting device 330 to indicate whether the wireless signal 362 is transmitted using CSD. In example implementations, the transmitting device 330 may indicate whether the wireless signal 362 is transmitted with CSD by embedding a CSD indicator and/or CSD format information into the wireless signal 362. It is noted that if the transmitting device 330 does not employ CSD to transmit the wireless signal 362, then the receiving device 310 may not need to compensate for delays associated with CSD (e.g., the receiving device 310 may reliably use the phases of the specified signal received from the transmitting device 330 for determining AoA information). Thus, if CSD is not used in the transmission of the wireless signal 362, the transmitting device 330 may embed, into the wireless signals 362, a CSD indicator that indicates a lack of CSD in the transmitted signals. In this manner, the receiving device 310 may extract the CSD indicator from the wireless signal 362 transmitted from the transmitting device 330, and determine that AoA information may be estimated without compensating for CSD (e.g., phase shifts) among the various components 362(1)-362(4) of the wireless signal 362.

However, if the transmitting device 330 employs CSD to transmit the wireless signal 362, then the transmitting device 330 may indicate CSD delays between its transmit chains (particularly if the actual CSD delays differ from CSD delays specified in the IEEE 802.11 family of standards). For example, the transmitting device 330 may set the CSD indicator to a state that indicates the use of CSD in transmitting the wireless signal 362 and/or may provide. In some aspects, the transmitting device 330 may provide (e.g., within the transmitted wireless signals 362) CSD format information indicative of the number of antennas and/or CSD values used to transmit the associated signal 362. In this manner, the receiving device 310 may derive, from the indicated CSD delays, one or more calibration values to compensate for the multipath effects associated with the CSD technique employed by the transmitting device 330. Thereafter, the receiving device 310 may estimate AoA information of the wireless signal 362 based on the phase information (e.g., which has been adjusted for CSD).

Figure 3D:
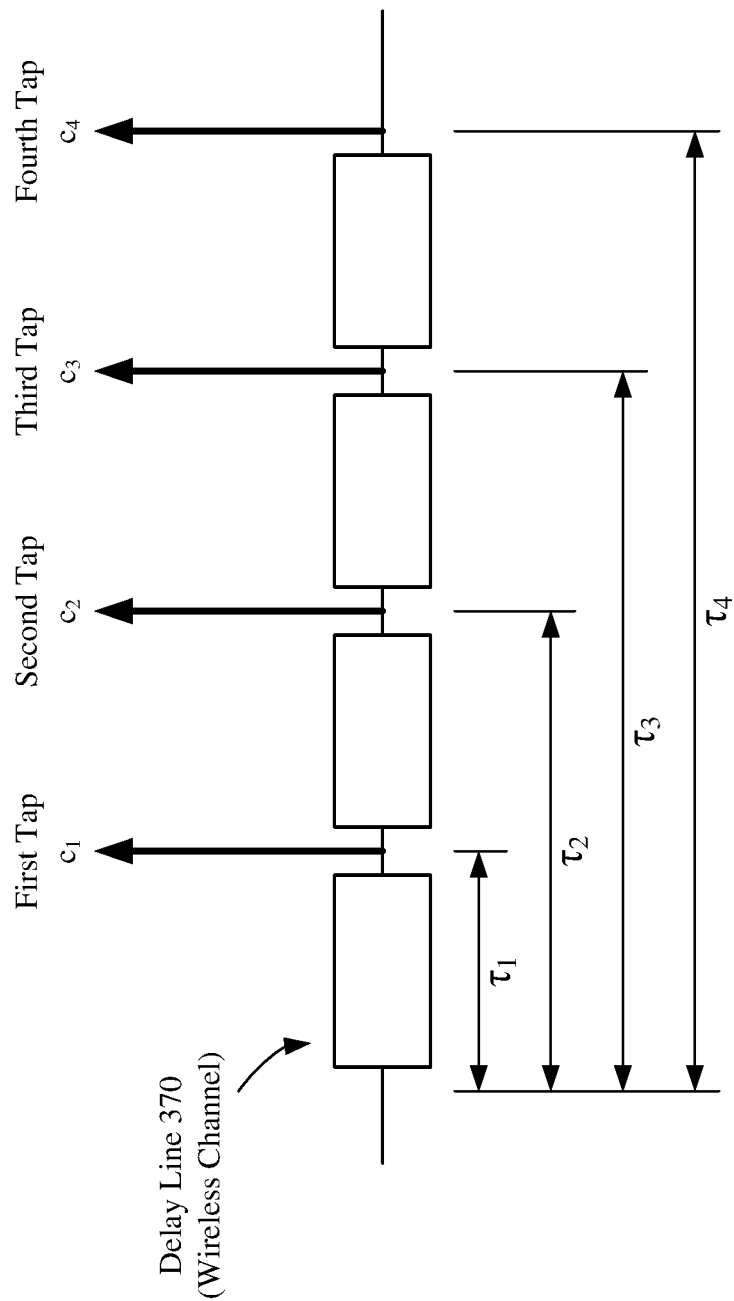
FIG. 3D shows an example tapped delay-line model of the wireless channel depicted in FIG. 3C.

In some aspects, the receiving device 310 may adjust the manner in which it determines the phase information of the wireless signal 362 based at least in part on the CSD. For example, as shown in FIG. 3D, the wireless channel (between the transmitting device 330 and the receiving device 310) may be modeled as a tapped delay-line 370. The delay-line 370 is shown to include a number of "taps" $c_1$-$c_4$ representing an impulse response of the wireless channel (e.g., with multipath effects). The impulse response function $h(t,\tau)$ may be expressed as:

$$h(t, \tau) = \sum_{i=1}^{N} c_i(t)\delta(\tau - \tau_i)$$

Where $c_i(t)$ are coefficients representing each impulse or tap of the delay-line 370 (e.g., $c_1$-$c_4$ in the example of FIG. 3D), N is the total number of impulses (e.g., N=4 for the example of FIG. 3D), and $\tau_i$ is the delay value associated with each impulse or tap (e.g., $\tau_1$-$\tau_4$ in the example of FIG. 3D).

As described above, with reference to FIG. 3C, cyclic shift delays employed by the transmitting device 330 may be perceived as multipath effects by the receiving device 310. Thus, assuming the transmitting device 330 employs CSD (e.g., by applying phase shifts to the second, third, and fourth components 362(2)-362(4) of the wireless signal 362), the first tap $c_1$ of the delay-line 370 may correspond to the first component 362(1) of the wireless signal 362; the second tap $c_2$ of the delay-line 370 may correspond to the second component 362(2) of the wireless signal 362; the third tap $c_3$ of the delay-line 370 may correspond to the third component 362(3) of the wireless signal 362; and the fourth tap $c_4$ of the delay-line 370 may correspond to the fourth component 362(4) of the wireless signal 362.

In example implementations, the receiving device 310 may use the CSD format information of the transmitting device 330 to determine the delay values $\tau_1$-$\tau_4$ associated with respective taps $c_1$-$c_4$ of the delay-line 370. It is noted that the first tap $c_1$ of the delay line 370 may correspond to a component (e.g., the first component 362(1)) of the wireless signal 362 that is transmitted without any phase offset attributable to CSD. Accordingly, the receiving device 310 may more accurately determine the phase information of the wireless signal 362 from the first tap $c_1$ of the delay-line 370. In some aspects, the receiving device 310 may use the CSD format information (e.g., indicating the phase shifts applied to the wireless signal 362) to determine the first tap $c_1$ of the delay-line 370, and to further determine the AoA information of the wireless signal 362 based on the first tap $c_1$.

The transmitting device 330 may communicate the CSD indicator and/or the CSD format information to the receiving device 310 in any suitable manner More specifically, the CSD indicator and/or the CSD format information may be embedded (or otherwise included) within any suitable portions of packets or frames associated with wireless signals transmitted to the receiving device 310. The CSD indicator may be one or more bits that indicate whether the specified signal is transmitted using CSD, and the CSD format information may be a plurality of bits indicating the number of transmit antennas used and/or the CSD phase shift values employed. In some aspects, the presence of CSD format information in a received packet may implicitly serve as a CSD indicator. The receiving device 310 may decode the CSD indicator to determine whether to compensate for CSD phase shift values in estimating the AoA information for the received wireless signal 362. The receiving device 310 may also decode the CSD format information to determine how to adjust or calculate the estimated AoA information in order to compensate for the CSD.

In another aspect, upon detecting a CSD indicator in a received packet, the receiving device 310 may estimate the AoA information of the wireless signal 362 based on portions of the packet that are transmitted without CSD. For example, the IEEE 802.11az standard describes a packet including a postamble that is configured to be transmitted without CSD. It is noted that the receiving device 310 may more accurately determine the phase information of a received wireless signal based on this postamble that is transmitted without CSD. Thus, for some implementations, the transmitting device 330 may transmit a packet to the receiving device 310 in accordance with existing 802.11 MAC/PHY technologies, whereby packets compliant with the IEEE 802.11az standards may include an additional postamble that is transmitted without CSD (e.g., to facilitate more accurate AoA estimation).

For some implementations, the CSD indicator and/or the CSD format information may be inserted within a preamble, a midamble, and/or a postamble of packets formatted, for example, in accordance with the future IEEE 802.11az standard. In some aspects, one or more symbols that contain the CSD indicator may be transmitted using a single antenna of the transmitting device 330, for example, to ensure that CSD phase shift values do not affect the estimation of AoA information. For other implementations, the CSD indicator and/or the CSD format information may be inserted within other portions of a packet including, for example, the packet's PHY header, MAC header, reserved field, one or more reserved bits within existing fields of the packet, an information element (IE), a vendor-specific information element (VSIE), and so on.

Figure 4A:
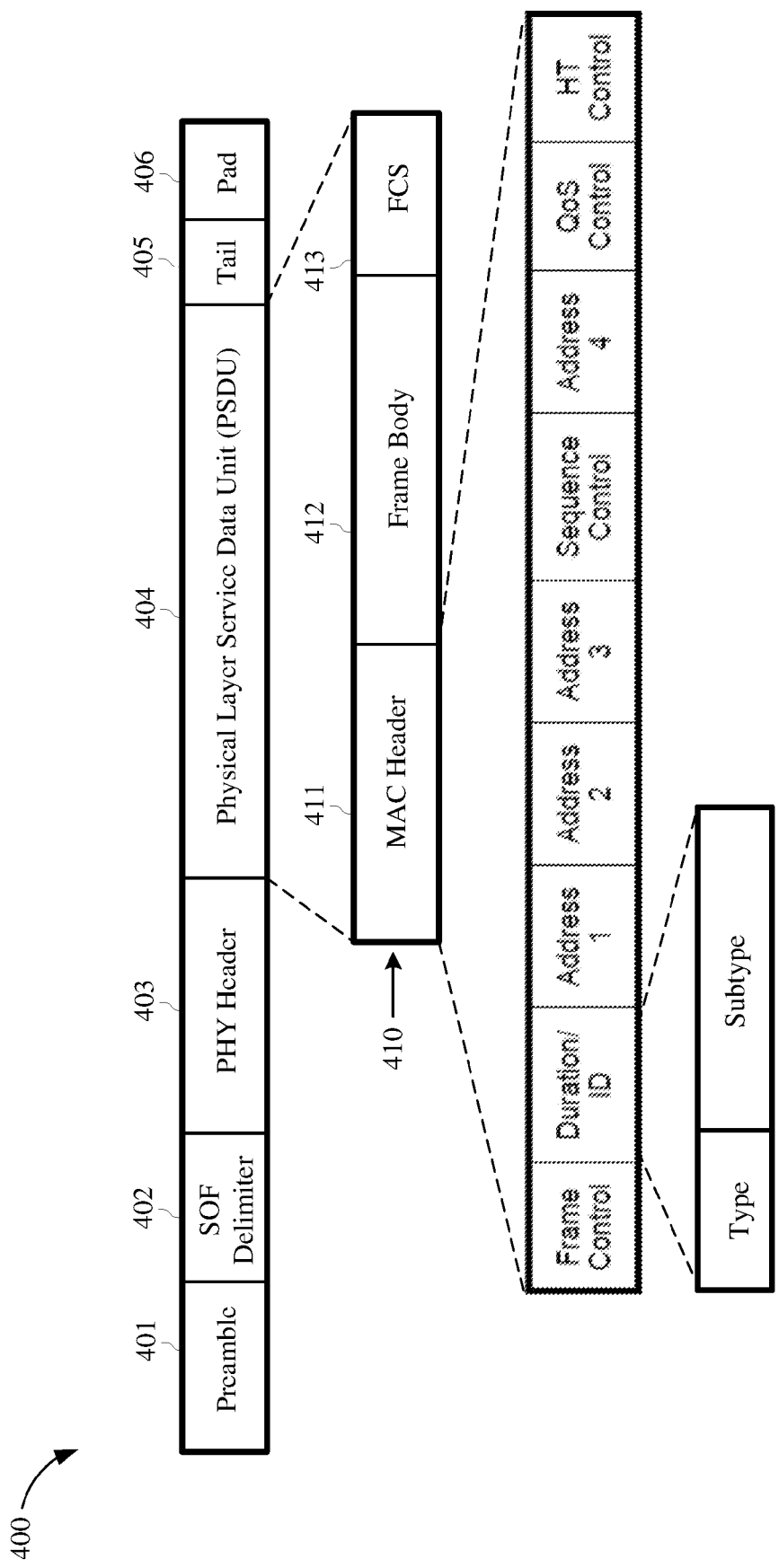
FIG. 4A shows an example packet within which aspects of the present disclosure may be implemented.

FIG. 4A shows an example packet 400 within which one or more aspects of the present disclosure may be implemented. The packet 400, which may be a VHT packet formatted in accordance with the IEEE 802.11ac standards, is shown to include a preamble 401, a start of frame (SOF) delimiter 402, a physical-layer (PHY) header 403, a Physical Layer Service Data Unit (PSDU) 404, a tail field 405, and a pad field 406.

The preamble 401 may include synchronization information, timing information, frequency offset correction information, and signaling information, for example, as described in more detail below with respect to FIG. 5B. In some aspects, the preamble 401 may include a field containing a synchronization pattern (e.g., an alternating "01" pattern) that may be used to detect a potentially receivable signal, select an antenna if diversity is utilized, and determine frequency offset correction and synchronization information. The SOF delimiter 402 may indicate the start of the data frame encapsulated within the packet 400. The PHY header 403 may include a number of fields for storing data rates, a reserved bit, a length of the PSDU 404, a parity bit, a number of tail bits, and service information, as described in more detail below with respect to FIG. 5A. The PSDU 404 may contain an MPDU 410. The tail field 405 may include a number of tail bits, and the pad field 406 may include a number of pad bits.

In accordance with aspects of the present disclosure, the CSD indicator and/or the CSD format information may be inserted or embedded within the preamble 401, the SOF delimiter 402, the PHY header 403, the PSDU 404, and/or the pad field 406. In some aspects, the CSD indicator and/or the CSD format information may be stored together in the same field or header of packet 400. In other aspects, the CSD indicator and/or the CSD format information may be stored in different fields or headers of packet 400.

The MPDU 410, which may be commonly referred to as a MAC frame, may be compliant with the IEEE 802.11 family of standards. The MPDU 410 includes a MAC header 411, a frame body 412, and a frame control sequence (FCS) field 413. The MAC header 411 may include a number of fields containing information that describes characteristics or attributes of one or more packets encapsulated with the frame body 412, may include a number of fields indicating source and destination addresses of the data encapsulated in the frame body 412, and may include a number of fields containing control information. For some implementations, MAC header 411 may be used as the MAC header of any suitable data frame, control frame, management frame, and/or action frame.

More specifically, as depicted in FIG. 4A, MAC header 411 may include a frame control field, a duration/ID field, an address 1 field, an address 2 field, an address 3 field, a sequence control field, an address 4 field, a Quality of Service (QoS) control field, and a high-throughput (HT) field. For at least some implementations, the frame control field is 2 bytes, the duration/ID field is 2 bytes, the address 1 field is 6 bytes, the address 2 field is 6 bytes, the address 3 field is 6 bytes, the sequence control field is 2 bytes, the address 4 field is 0 or 6 bytes, the QoS control field is 0 or 2 bytes, and the HT field is 0 or 4 bytes. For other implementations, the fields of the MAC header 411 of FIG. 4A may be of other suitable lengths. The frame control field may include at least a type field and a sub-type field.

Figure 4B:
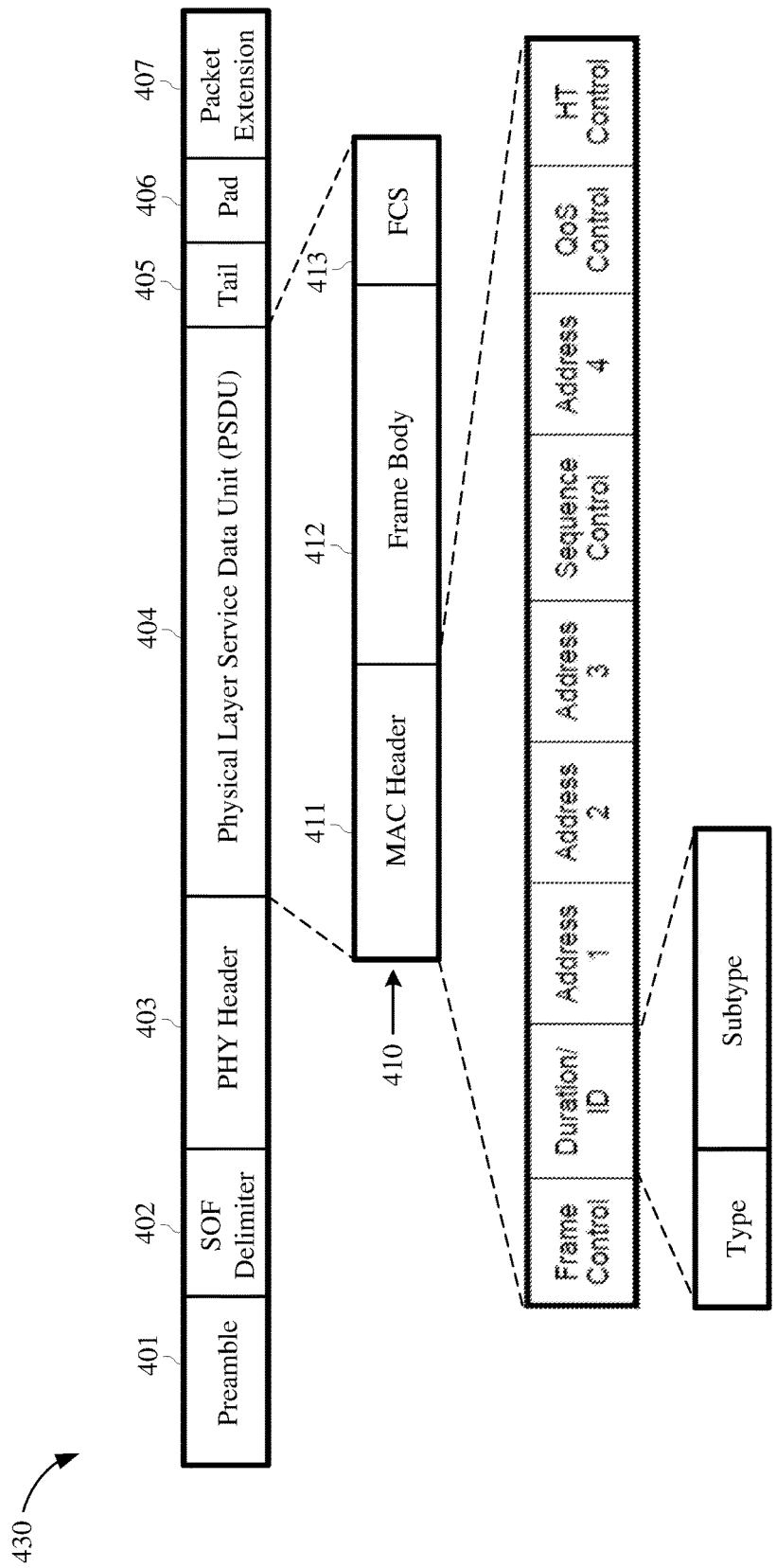
FIG. 4B shows another example packet within which aspects of the present disclosure may be implemented.

FIG. 4B shows an example packet 430 within which one or more aspects of the present disclosure may be implemented. Packet 430 is similar to the example packet 400 of FIG. 4A, except that packet 430 of FIG. 4B is shown to include a packet extension 407 appended to the end of the packet 430. In some aspects, packet 430 may be a HE packet formatted in accordance with the IEEE 802.11ax standards.

The packet extension 407 does not typically store any data. Instead, the packet extension 407 typically stores "dummy" data (e.g., repeating the last symbol of the packet payload), for example, to allow a receiving device more time to decode packet 430 without giving up medium access granted to a transmitting device. For at least some implementations, the packet extension 407 may be used to store one or more sounding sequences such as, for example, sounding LTFs. Sounding LTFs may be HE-LTFs, or may be VHT-LTFs, or any LTFs that may be used for channel sounding purposes. These one or more sounding LTFs may be used by a receiving device to estimate MIMO channel conditions, which in turn may be used by the receiving device to estimate AoD information for frames transmitted by a transmitting device.

Figure 5A:
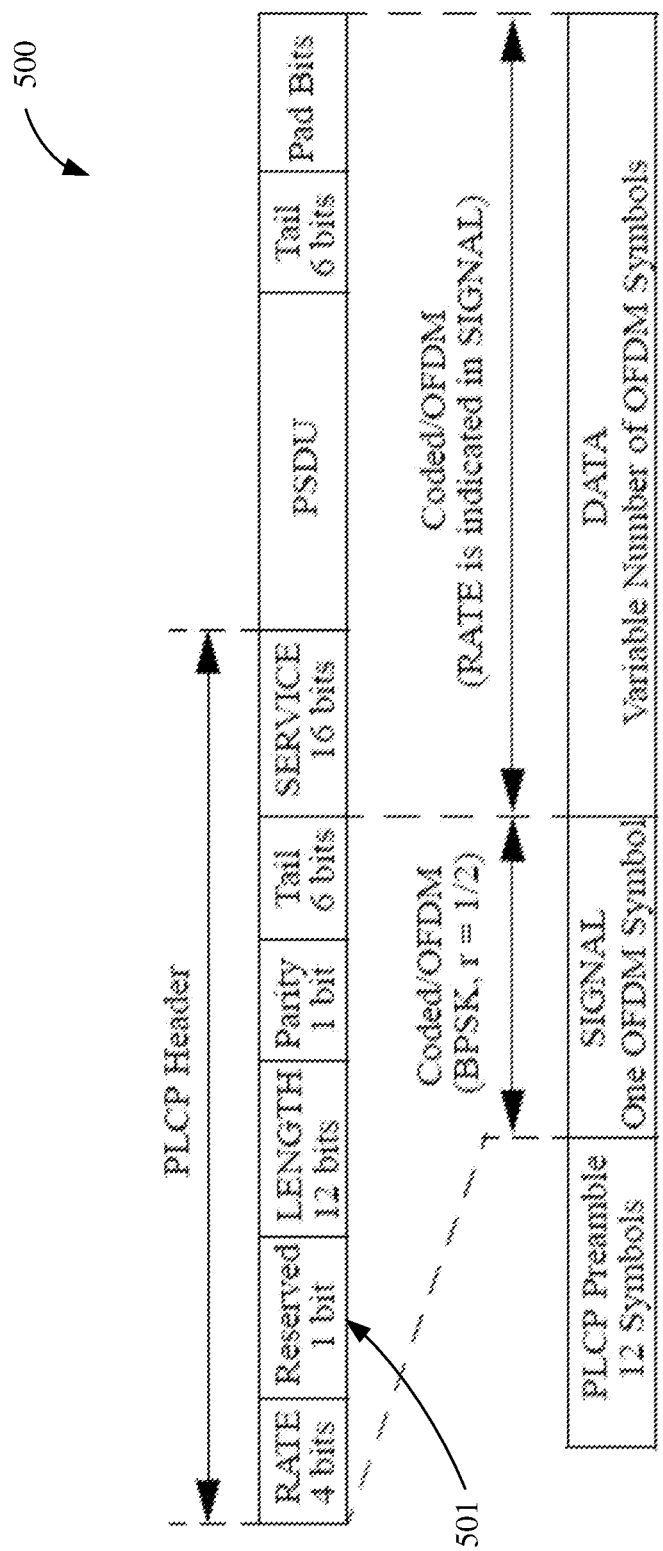
FIG. 5A shows an example frame within which aspects of the present disclosure may be implemented.

FIG. 5A shows an OFDM frame 500 within which aspects of the present disclosure may be implemented. The OFDM frame 500 may be used to transport any suitable data frame, control frame, management frame, and/or action frame between wireless devices. In some aspects, the CSD indicator may be the reserved bit 501 of the Physical Layer Convergence Protocol (PLCP) header of the OFDM frame 500. In other aspects, the CSD indicator may be provided within the pad bits of the OFDM frame 500.

Because the reserved bit 501 the PLCP header may be used for another purpose, it may be desirable to insert the CSD indicator into a high-throughput (HT) frame or into a very high-throughput (VHT) frame or into a High Efficiency (HE) frame.

FIG. 5B shows an example preamble 510 of a VHT packet within which aspects of the present disclosure may be implemented. The preamble 510 may be one implementation of the preamble 401 of the packet 400 of FIG. 4A and/or the preamble 401 of the packet 430 of FIG. 4B. The preamble 510, which may be compliant with the IEEE 802.11ac standards, is shown to include a Legacy Short Training Field (L-STF) 512, a Legacy Long Training Field (L-LTF) 513, a Legacy Signal (L-SIG) 514, a very-high throughput signaling A (VHT-SIG-A) field 515, a VHT-STF field 516, a VHT-LTF field 517, and a VHT-SIG-B field 518.

The L-STF 512 may include information for coarse frequency estimation, automatic gain control, and timing recovery. The L-LTF 513 may include information for fine frequency estimation, channel estimation, and fine timing recovery. The L-SIG field 514 may include modulation and coding information. The VHT-SIG-A field 515 may include parameters such as an indicated bandwidth, a payload guard interval (GI), a coding type, a number of spatial streams (Nsts), a space-time block coding (STBC), beamforming information, and so on. Information contained in the VHT-STF 516 may be used to improve automatic gain control estimates for SU-MIMO and MU-MIMO communications, and information contained in the VHT-LTF 517 may be used to estimate various MIMO channel conditions. The VHT-SIG-B field 518 may include additional SU-MIMO and MU-MIMO information including, for example, user-specific information and the number of spatial streams associated with a given frame transmission.

In some aspects, the CSD indicator and/or the CSD format information may be embedded within one of the SIG fields 514 or 518 of the preamble 510, may be embedded within staggered VHT fields 515-518 of the preamble 510, may be embedded within the VHT-LTF field 517 of the preamble 510, or may be appended to the end of the preamble 510. In other aspects, the CSD indicator may be pre-pended to preamble 510, or may be provided in a field that is inserted between a pair of the fields 512-518 of preamble 510. The CSD indicator may be embedded within the scrambler-seed of the PLCP header of a packet.

The CSD indicator may be inserted into an HT preamble in a manner similar to that described above with respect to the VHT preamble 510 of FIG. 5B (except that the CSD indicator may be inserted into the HT-SIG field of the HT preamble, not shown for simplicity).

As described above, the CSD format information may indicate the number of antennas and/or the CSD delays used to transmit the specified signal. A receiving device may use information provided in one or more of the signaling fields (e.g., the HT-SIG field, the VHT-SIG fields, and/or the HEW-SIG field) of the received preamble 510 to determine the number of spatial streams associated with the specified signal. For one example, if the transmitting and receiving devices negotiate HT frame exchanges, then the receiving device may determine the number of spatial streams using information provided in the HT-SIG field of the specified signal. For another example, if the transmitting and receiving devices negotiate VHT frame exchanges, then the receiving device may determine the number of spatial streams using information provided in one of the VHT-SIG fields of the specified signal. The receiving device may also identify a CSD format for the specified signal. For example, the receiving device may identify the CSD format based, at least in part, on the number of antennas and the number of spatial streams used by the transmitting device. After identifying the CSD format used by the transmitting device, the receiving device may more accurately estimate AoA information of wireless signals received form the transmitting device (e.g., after compensating for the identified CSD format).

In some aspects, the CSD indicator and/or CSD format information may be included in a prior exchange of frames between a transmitting device and a receiving device. Although the prior exchange of frames may require the transmitting device and the receiving device to be associated with each other, association may provide a degree of trust between the transmitting device and the receiving device. More specifically, association between the transmitting device and the receiving device may increase privacy for the transmitting device, for example, because unassociated receiving devices may not be able to position transmitting devices as accurately as receiving devices that are associated with the transmitting device.

Still further, in some aspects, the CSD indicator and/or CSD format information may be provided from the transmitting device to the receiving device in any suitable type of frame, packet, signal, or symbol. For one example, the CSD indicator and/or CSD format information may be provided within a management frame (e.g., beacon frames, probe requests, probe responses, association requests, and so on), within a control frame (e.g., ACK frame, block ACK frame, PS-Poll frame, and so on), and/or within a data frame. The receiving device may store the CSD indicators and/or CSD format information for one or more other devices in the CSD table 242 of FIG. 2.

Upon receiving a frame from a transmitting device, a receiving device may decode the address of the transmitting device, and use the decoded address to retrieve an entry from the CSD table 242 corresponding to the transmitting device (e.g., by using the decoded address as a look-up value or search key). The entry retrieved from the CSD table 242 may include an indication as to whether the transmitting device employs CSD in its transmission of wireless signals, and may include CSD format information indicative of phase shifts between the transmit chains of the transmitting device.

In some aspects, the CSD table 242 may include, for each device, an identifier (e.g., the device's MAC address, association identification (AID), IP address, and so on) and an indication as to whether the device employs CSD.

In this manner, when the receiving device is to estimate AoA information for signals received from a transmitting device, the receiving device may determine whether the specified signals are transmitted with CSD by access the CSD table 242. If the transmitting device does not employ CSD, then the receiving device may accurately estimate AoA information without compensating for various phase shifts (attributable to CSD) in the received signals. Conversely, if the transmitting device employs CSD, then the receiving device may need to compensate for such phase shifts when estimating the AoA information for the received from the transmitting device.

FIG. 5C shows an example preamble 520 of a HE packet within which aspects of the present disclosure may be implemented. The preamble 520 may be one implementation of the preamble 401 of the packet 400 of FIG. 4A and/or the packet 430 of FIG. 4B. The preamble 520, which may be compliant with the IEEE 802.11ax standards, is shown to include the L-STF field 512, the L-LTF field 513, and the L-SIG field 514 of preamble 510, as well as a Repeated Legacy Signal (RL-SIG) field 521, a set of HE Signal-A (HE-SIG-A1/HE-SIG-A2) fields 522, a HE Signal B (HE-SIG-B) field 523, a HE Short Training Field (HE-STF) 524, and a HE Long Training Field (HE-LTF) 525.

The RL-SIG field 521, which may be used to identify packet 520 as an HE packet, may include a time-domain waveform generated by repeating the time-domain waveform of the L-SIG field 514. The HE-SIG-A1 and HE-SIG-A2 fields 522 may include parameters such as an indicated bandwidth, a payload guard interval (GI), a coding type, a number of spatial streams (Nsts), a space-time block coding (STBC), beamforming information, and so on.

In some aspects, the HE-SIG-A1 and HE-SIG-A2 fields 955 may include a set of fields to store parameters describing the type of information stored in the HE-LTF 525 (e.g., whether the HE-LTF 525 is configured with information from which a receiving device may obtain an AoA information). For example, the set of fields includes (1) a CP+LTF Size field that stores a cyclic prefix (CP) value and a length of the HE-LTF 525; (2) an Nsts field to store information indicating the number spatial streams, (3) a STBC field store a value for space-time block coding, and (4) a transmit beamforming (TxBF) field to store information pertaining to beamforming.

The HE-SIG-B field 523 may include resource unit (RU) allocation information associated with orthogonal frequency division multiple access (OFDMA) transmissions, for example, as described in the IEEE 802.11ax specification.

Information contained in the HE-STF 524 may be used to improve automatic gain control estimates for SU-MIMO and MU-MIMO communications, and information contained in the HE-LTF 525 may be used to estimate various MIMO channel conditions. In some aspects, the HE-LTF 525 may include information (e.g., sounding sequences) from which AoA information may be determined.

In some aspects, the CSD indicator may be embedded within one of the signaling fields 514 or 522 of the preamble 520, may be embedded within staggered VHT fields 515-518 of the preamble 510, or may be appended to the end of the preamble 520. In other aspects, the CSD indicator may be pre-pended to preamble 520, or may be provided in a field that is inserted between any pair of fields within the preamble 520. The CSD indicator may be embedded within the scrambler-seed of the PLCP header of a packet.

Figure 6:
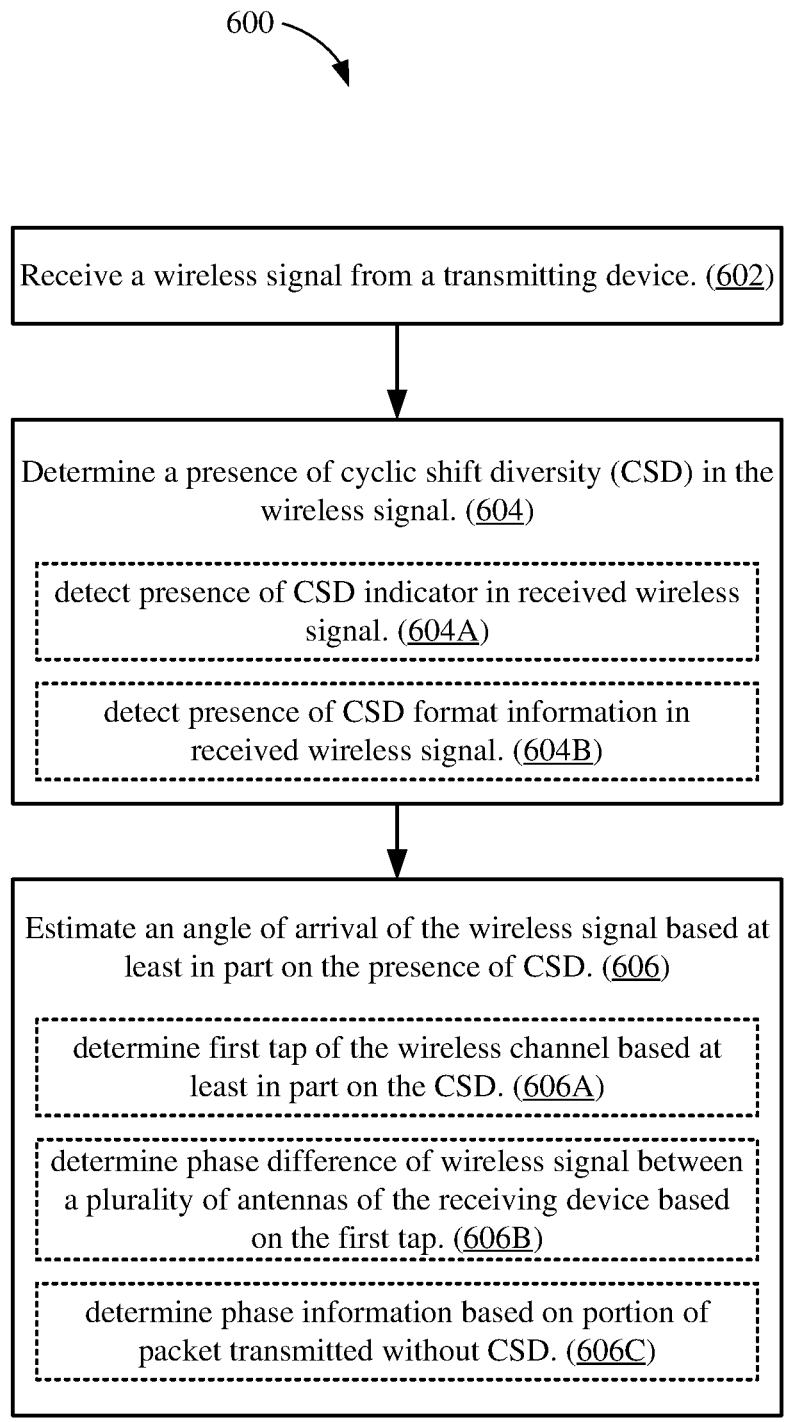
FIG. 6 shows an illustrative flow chart depicting an example operation for estimating angle of arrival information according to aspects of the present disclosure.

FIG. 6 is a flow chart depicting an example operation 600 for estimating an angle of arrival of wireless signals in accordance with some aspects of the present disclosure. Although the example operation 600 is described below as being performed by a receiving device to estimate AoA information of a wireless signal transmitted from a transmitting device, it is to be understood that the example operation 600 may be performed by any suitable wireless device including, for example, the AP 110 of FIG. 1, the stations STA1-STA4 of FIG. 1, or the wireless device 200 of FIG. 2.

The receiving device may receive the wireless signal from the transmitting device (602). For example, the receiving device may receive the wireless signal using one or more of antennas 250(1)-250(n) and the transceivers 211 depicted in FIG. 2. For purposes of discussion herein, the wireless signal is transmitted from the transmitting device using a plurality of antennas. In some aspects, the number of antennas (e.g., of the transmitting device) used to transmit the wireless signal may be greater than the number of antennas (e.g., of the receiving device) used to receive the wireless signal.

The receiving device may determine a presence of cyclic shift diversity (CSD) in the wireless signal (604). For some implementations, the receiving device may determine the presence of CSD in the wireless signal by executing the CSD indicator software module 244 of FIG. 2. In some aspects, the receiving device may detect, in the wireless signal, a CSD indicator indicating whether the corresponding signal is transmitted with CSD (604A). In other aspects, the receiving device may detect, in the wireless signal, CSD format information indicating a number of antennas and/or CSD values used to transmit the wireless signal (604B). The CSD indicator and/or CSD format information may be embedded or otherwise included within any suitable portion of the wireless signal. For one example, the CSD indicator and/or CSD format information may be embedded within a preamble, midamble, or postamble of the packet. For another example, the CSD indicator and/or CSD format information may be embedded within a PHY header of the packet, a MAC header of the packet, a signaling field of the packet, or a packet extension of the packet.

The receiving device may then estimate an angle of arrival of the wireless signal based at least in part on the presence of CSD (606). For some implementations, the receiving device may estimate the angle of arrival of the wireless signal by executing the angle information estimation software module 246 of FIG. 2. In some aspects, the receiving device may determine a first tap of the wireless channel based at least in part on the CSD, for example, as described above with respect to FIGS. 3B and 3C (606A). The receiving device may then determine a phase difference of the wireless signal between a plurality of antennas of the receiving device based on the first tap, for example, as described above with respect to FIGS. 3B and 3C (606B). In other aspects, the receiving device may determine the phase information of the wireless signal based on a portion of the received packet that is transmitted without CSD (606C). Still further, in other aspects, the receiving device may estimate the angle of arrive of the wireless signal using any well-known technique for estimating AoA information.

Figure 7:
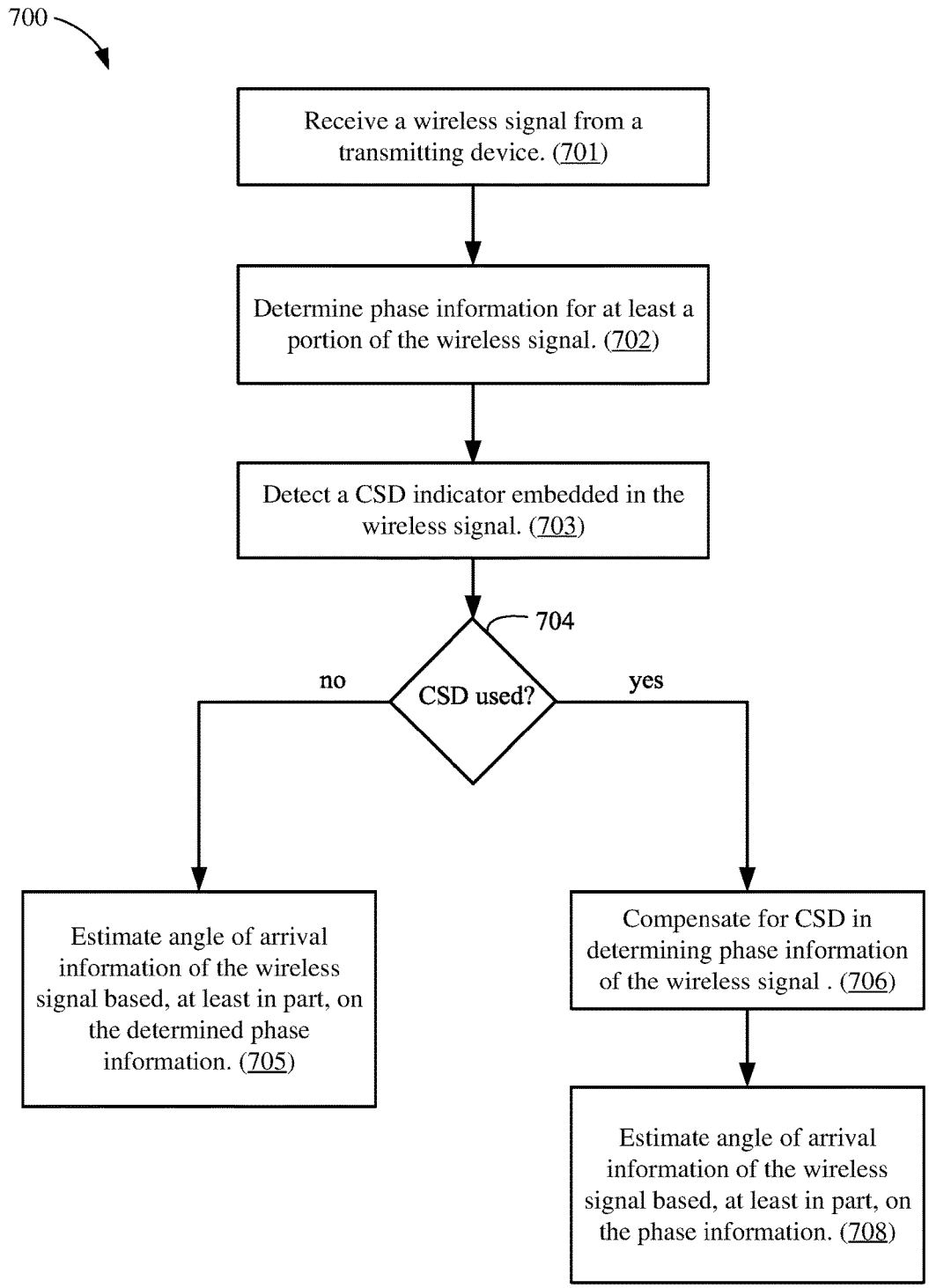
FIG. 7 shows an illustrative flow chart depicting another example operation for estimating angle of arrival information according to aspects of the present disclosure.

FIG. 7 is a flow chart depicting another example operation 700 for estimating an angle of arrival of wireless signals in accordance with some aspects of the present disclosure. Although the example operation 700 is described below as being performed by a receiving device to estimate AoA information of a wireless signal transmitted from a transmitting device, it is to be understood that the example operation 700 may be performed by any suitable wireless device including, for example, the AP 110 of FIG. 1, the stations STA1-STA4 of FIG. 1, or the wireless device 200 of FIG. 2. In some aspects, the receiving device may be an access point, and the transmitting device may be a station associated or unassociated with the access point. In other aspects, the receiving device may be a station, and the transmitting device may be the access point. In still other aspects, the receiving device and the transmitting device may communicate directly with each other.

The receiving device may receive a wireless signal from the transmitting device (701). For example, the receiving device may receive the wireless signal using one or more of antennas 250(1)-250(n) and transceivers 211 depicted in FIG. 2. In some aspects, the wireless signal may include a CSD indicator and/or CSD format information (e.g., as described above with respect to FIGS. 4A-4B and 5A-5C). In other aspects, the receiving device may determine whether the transmitting device employs CSD by retrieving CSD information from the CSD table 242 of FIG. 2.

The receiving device may determine phase information for at least a portion of the wireless signal (702). In some aspects, the phase information may be determined by executing the angle information estimation software module 246 depicted in FIG. 2. The receiving device may detect that the CSD indicator is embedded within the wireless signal (703), and may then decode the CSD indicator to determine whether CSD is used by the transmitting device to transmit the wireless signal (704). In some aspects, the receiving device may detect and decode the CSD indicator by executing the CSD indicator software module 244 of FIG. 2.

If the transmitting device did not use CSD to transmit the wireless signal, as tested at 704, then the receiving device may estimate angle of arrival information of the wireless signal based, at least in part, on the determined phase information (705). For example, the receiving device may estimate the angle of arrival information based on the first tap of the wireless channel. In some aspects, the receiving device may estimate the angle of arrival information by executing the angle information estimation software module 246 of FIG. 2.

Conversely, if the transmitting device used CSD to transmit the wireless signal, as tested at 704, then the receiving device may apply this information to compensate or otherwise account for the CSD in determining the phase information (706). For example, the receiving device may determine the first tap of the wireless channel based at least in part on the CSD format used by the transmitting device to transmit the wireless signal. In another example, the receiving device may determine the phase information based on a portion (e.g., postamble) of the packet that is transmitted without CSD (e.g., in accordance with the IEEE 802.11az standards). In some aspects, the phase information may be determined by executing the phase information determination software module 245 of FIG. 2. As described above, the CSD format used by the transmitting device may be provided within the wireless signal (e.g., as CSD format information).

Then, the receiving device may estimate angle of arrival information of the wireless signal based, at least in part, on the phase information (708). For example, by compensating for CSD in determining the phase information of the wireless signal, the receiving device may more accurately estimate the angle of arrival of the wireless signal. In some aspects, the receiving device may estimate the angle of arrival information by executing the angle information estimation software module 246 of FIG. 2.

Figure 8:
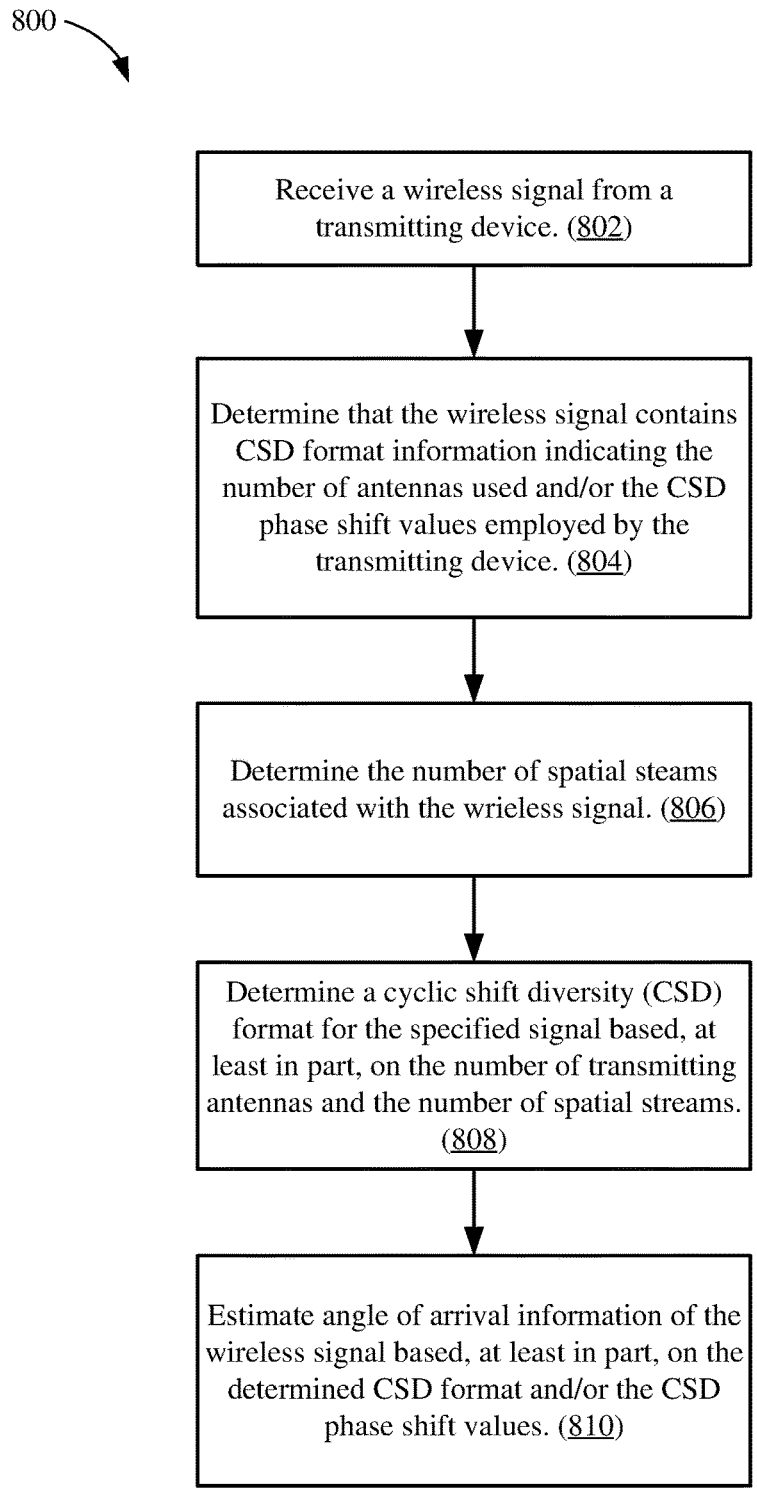
FIG. 8 shows another illustrative flow chart depicting yet another example operation for estimating angle of arrival information according to aspects of the present disclosure.

FIG. 8 is a flow chart depicting an example operation 800 for estimating angle of arrival of wireless signals in accordance with some aspects of the present disclosure. Although the example operation 800 is described below as being performed by a receiving device to estimate AoA information of a wireless signal transmitted from a transmitting device, it is to be understood that the example operation 800 may be performed by any suitable wireless device including, for example, the AP 110 of FIG. 1, the stations STA1-STA4 of FIG. 1, or the wireless device 200 of FIG. 2. In some aspects, the receiving device may be an access point, and the transmitting device may be a station associated or unassociated with the access point. In other aspects, the receiving device may be a station, and the transmitting device may be the access point. In still other aspects, the receiving device and the transmitting device may communicate directly with each other.

The receiving device may receive a wireless signal from a transmitting device (802). For example, the receiving device may receive the wireless signal using one or more of antennas 250(1)-250(n) and transceivers 211 depicted in FIG. 2. In some aspects, the wireless signal may include the CSD indicator and/or the CSD format information (e.g., as described above with respect to FIGS. 4A-4B and 5A-5C). In other aspects, the receiving device may determine whether the transmitting device employs CSD by retrieving a corresponding entry from the CSD table 242 of FIG. 2.

The receiving device may determine that the wireless signal contains CSD format information indicating the number of antennas used and/or the CSD phase shift values employed by the transmitting device (804). In some aspects, the receiving device may determine that the wireless signal contains the information by executing the CSD indicator software module 244 of FIG. 2. For some implementations, the CSD format information may be provided in at least a portion of the received signal. In other implementations, the CSD format information may be provided in at least a portion of another wireless signal (previously) received from the transmitting device.

The receiving device may also determine a number of spatial streams associated with the wireless signal (806). In some aspects, the receiving device may determine the number of spatial streams by executing the CSD indicator software module 244 of FIG. 2. For example, the number of spatial streams may be determined based, at least in part, on information contained in an HT-SIG field or one of the VHT-SIG fields of the wireless signal. A CSD format may be determined for the received signal based, at least in part, on the number of transmitting antennas and the number of spatial streams (808). For example, the receiving device may identify the CSD format by executing the CSD indicator software module 244 of FIG. 2.

The receiving device may then estimate angle of arrival information of the wireless signal based, at least in part, on the determined CSD format and/or the CSD phase shift values (810). For example, the receiving device may compensate for the CSD in the received signal to more accurately estimate the angle of arrival of the wireless signal. In some aspects, the receiving device may estimate the angle of arrival information by executing the angle information estimation software module 246 of FIG. 2.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, in some aspects, a means for receiving a wireless signal from a transmitting device over a wireless channel may correspond to a transceiver (e.g., transceivers 211 of FIG. 2). A means for determining a presence of cyclic shift diversity (CSD) in the wireless signal may correspond to a processor (e.g., execution of the CSD indicator software module 244 by processor 230 of FIG. 2). A means for estimating an angle of arrival of the wireless signal based at least in part on the presence of CSD may correspond to a processor (e.g., execution of the angle information estimation software module 246 by processor 230 of FIG. 2).

According to certain aspects, such means may be implemented by processing systems configured to perform the corresponding functions by implementing various algorithms (e.g., in hardware or by executing software instructions) described above for generating frames for transmission during a sector sweep procedure.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface (in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of determining angular information of a wireless signal received at a receiving device, the method comprising:
    receiving the wireless signal from a transmitting device over a wireless channel, wherein the wireless signal includes a packet with a postamble without cyclic shift diversity (CSD);
    determining a presence of CSD in the wireless signal, wherein the determining comprises detecting a presence of a CSD indicator or CSD format information in the wireless signal; and
    estimating an angle of arrival of the wireless signal based at least in part on the presence of CSD and the postamble.

2. The method of claim 1, wherein the estimating further comprises:
    determining a first tap of an impulse response of the wireless channel based at least in part on the CSD; and
    determining a phase difference of the wireless signal between a plurality of antennas of the receiving device based on the first tap of the impulse response of the wireless channel.

3. The method of claim 1, wherein the CSD format information indicates at least one of a number of transmit antennas or CSD values used to transmit the wireless signal.

4. The method of claim 1, wherein the CSD indicator is embedded within at least one of a preamble, a midamble, a postamble, or a header of a frame associated with the wireless signal.

5. The method of claim 1, wherein the CSD indicator is embedded within a preamble signaling field of at least one of a high-throughput (HT) frame, a very high-throughput (VHT) frame, or a high efficiency (HE) frame associated with the wireless signal.

6. The method of claim 1, wherein the CSD indicator and the CSD format information are embedded within the same field or header of a frame associated with the wireless signal.

7. The method of claim 1, wherein the CSD indicator and the CSD format information are embedded within different fields or different headers of a frame associated with the wireless signal.

8. A receiving device, comprising:
    one or more processors; and
    a memory configured to store instructions that, when executed by the one or more processors, cause the receiving device to:
        receive a wireless signal from a transmitting device over a wireless channel, wherein the wireless signal includes a packet with a postamble without cyclic shift diversity (CSD);
        detect a presence of a CSD indicator or CSD format information in the wireless signal to determine a presence of CSD in the wireless signal; and
        estimate an angle of arrival of the wireless signal based at least in part on the presence of CSD and the postamble.

9. The receiving device of claim 8, wherein execution of the instructions to estimate the angle of arrival further causes the receiving device to:
    determine a first tap of an impulse response of the wireless channel based at least in part on the CSD; and
    determine a phase difference of the wireless signal between a plurality of antennas of the receiving device based on the first tap of the impulse response of the wireless channel.

10. The receiving device of claim 8, wherein the CSD format information indicates at least one of a number of transmit antennas or CSD values used to transmit the wireless signal.

11. The receiving device of claim 8, wherein the CSD indicator is embedded within at least one of a preamble, a midamble, a postamble, or a header of a frame associated with the wireless signal.

12. The receiving device of claim 8, wherein the CSD indicator is embedded within a preamble signaling field of at least one of a high-throughput (HT) frame, a very high-throughput (VHT) frame, or a high efficiency (HE) frame associated with the wireless signal.

13. The receiving device of claim 8, wherein the CSD indicator and the CSD format information are embedded within the same field or header of a frame associated with the wireless signal.

14. The receiving device of claim 8, wherein the CSD indicator and the CSD format information are embedded within different fields or different headers of a frame associated with the wireless signal.

15. A non-transitory computer-readable medium comprising instructions that, when executed by one or more processors of a receiving device, cause the receiving device to perform operations comprising:
receiving a wireless signal from a transmitting device over a wireless channel, wherein the wireless signal includes a packet with a postamble without cyclic shift diversity (CSD);
determining a presence of CSD in the wireless signal, wherein the determining comprises detecting a presence of a CSD indicator or CSD format information in the wireless signal; and
estimating an angle of arrival of the wireless signal based at least in part on the presence of CSD and the postamble.

16. The non-transitory computer-readable medium of claim 15, wherein execution of the instructions to estimate the angle of arrival further causes the receiving device to perform operations comprising:
determining a first tap of an impulse response of the wireless channel based at least in part on the CSD; and
determining a phase difference of the wireless signal between a plurality of antennas of the receiving device based on the first tap of the impulse response of the wireless channel.

17. The non-transitory computer-readable medium of claim 15, wherein the CSD format information indicates at least one of a number of transmit antennas or CSD values used to transmit the wireless signal.

18. The non-transitory computer-readable medium of claim 15, wherein the CSD indicator is embedded within at least one of a preamble, a midamble, a postamble, or a header of a frame associated with the wireless signal.

19. The non-transitory computer-readable medium of claim 15, wherein the CSD indicator is embedded within a preamble signaling field of at least one of a high-throughput (HT) frame, a very high-throughput (VHT) frame, or a high efficiency (HE) frame associated with the wireless signal.

20. The non-transitory computer-readable medium of claim 15, wherein the CSD indicator and the CSD format information are embedded within the same field or header of a frame associated with the wireless signal.

21. The non-transitory computer-readable medium of claim 15, wherein the CSD indicator and the CSD format information are embedded within different fields of different headers of a frame associated with the wireless signal.

22. A receiving device, comprising:
means for receiving a wireless signal from a transmitting device over a wireless channel, wherein the wireless signal includes a packet with a postamble without cyclic shift diversity (CSD);
means for determining a presence of CSD in the wireless signal by detecting a presence of a CSD indicator or CSD format information in the wireless signal; and
means for estimating an angle of arrival of the wireless signal based at least in part on the presence of CSD and the postamble.

23. The receiving device of claim 22, wherein the means for estimating the angle of arrival of the wireless signal comprises:
means for determining a first tap of an impulse response of the wireless channel based at least in part on the CSD; and
means for determining a phase difference between a plurality of antennas of the receiving device based on the first tap of the impulse response of the wireless channel.

24. The receiving device of claim 22, wherein the CSD format information indicates at least one of a number of transmit antennas or CSD values used to transmit the wireless signal.

25. The receiving device of claim 22, wherein the CSD indicator is embedded within a preamble signaling field of at least one of a high-throughput (HT) frame, a very high-throughput (VHT) frame, or a high efficiency (HE) frame associated with the wireless signal.

26. The receiving device of claim 22, wherein the CSD indicator is embedded within at least one of a preamble, a midamble, a postamble, or a header of a frame associated with the wireless signal.

* * * * *